United States Patent
Horn

(10) Patent No.: US 7,139,931 B2
(45) Date of Patent: Nov. 21, 2006

(54) METHOD OF CONTROLLING THE SYSTEM PERFORMANCE AND RELIABILITY IMPACT OF HARD DISK DRIVE REBUILD

(75) Inventor: Robert Horn, Yorba Linda, CA (US)

(73) Assignee: Aristos Logic Corporation, Foothill Ranch, CA (US)

(*) Notice: Subject to any disclaimer, the term of this patent is extended or adjusted under 35 U.S.C. 154(b) by 602 days.

(21) Appl. No.: 10/295,881

(22) Filed: Nov. 18, 2002

(65) Prior Publication Data

US 2005/0102552 A1 May 12, 2005

Related U.S. Application Data

(60) Provisional application No. 60/404,138, filed on Aug. 19, 2002.

(51) Int. Cl.
*G06F 11/00* (2006.01)
(52) U.S. Cl. .......................................... 714/6; 711/114
(58) Field of Classification Search .................... 714/6, 714/7, 8; 711/114
See application file for complete search history.

(56) References Cited

U.S. PATENT DOCUMENTS

| 5,101,492 A | | 3/1992 | Schultz et al. | |
|---|---|---|---|---|
| 5,651,133 A | | 7/1997 | Burkes et al. | |
| 5,742,752 A | | 4/1998 | DeKoning | |
| 5,822,584 A | * | 10/1998 | Thompson et al. | 718/103 |
| 5,961,652 A | * | 10/1999 | Thompson | 714/6 |
| RE36,846 E | * | 8/2000 | Ng et al. | 714/6 |
| 6,112,255 A | | 8/2000 | Dunn et al. | |
| 6,138,125 A | | 10/2000 | DeMoss | |
| 6,219,800 B1 | | 4/2001 | Johnson et al. | |
| 2004/0059958 A1 | * | 3/2004 | Umberger et al. | 714/5 |

* cited by examiner

*Primary Examiner*—Dieu-Minh Le
(74) *Attorney, Agent, or Firm*—Dickstein Shapiro LLP

(57) ABSTRACT

A method of volume rebuilding in a RAID for a networked storage system in which portions of a hard disk drive under rebuild are progressively made available to the system during the rebuild process as the portions are rebuilt. The impact of rebuild activity on system performance is controllable by allowing non-rebuild requests to throttle rebuild requests.

9 Claims, 4 Drawing Sheets

METHOD OF CONTROLLING THE SYSTEM PERFORMANCE AND RELIABILITY IMPACT OF HARD DISK DRIVE REBUILD

This application claims the benefit of U.S. Provisional Application Ser. No. 60/404,138, filed Aug. 19, 2002, the disclosure of which is herein incorporated in its entirety by reference.

FIELD OF THE INVENTION

The present invention relates to fault-tolerant disk storage methods and systems.

BACKGROUND OF THE INVENTION

As electronically stored data becomes increasingly central to the effective operation of business, government, and academia, systems that ensure that data is safe and instantly available are in demand. The primary method for storing user-accessible data is the hard disk drive. Because hard disk drives are not one hundred percent reliable, systems and methods have been developed to protect against failure. One such approach, redundant arrays of inexpensive (or independent) disks (RAID) configurations, has been used for years to provide protection and high availability of data. RAID configurations include a number of independent hard disk drives and a specialized RAID controller. RAID systems can be configured to provide both data redundancy and performance enhancement, which are accomplished in RAID systems using a number of techniques such as striping and mirroring. Striping interleaves data across multiple storage elements for better performance. Mirroring duplicates data across two or more storage elements for redundancy.

When a hard disk drive in a RAID system fails, the hard disk drive is no longer available for data transfers. Specific RAID architectures, including those that use mirroring, mirroring with striping, and striping with parity, provide data redundancy so that no data is lost. However, the performance and the level of data redundancy of the RAID system are decreased until the failed hard disk drive can be replaced and rebuilt with all of the data. It is desirable that the RAID system remains on-line during this rebuild process. If a hard disk drive fails, RAID arrays currently have the capability of rebuilding a replacement hard disk drive without taking the RAID system offline. During the rebuild process, all read commands directed to the logical block address (LBA) of the hard disk drive being rebuilt must be handled by using the redundant data striped or mirrored on the other hard disk drives in the RAID array.

Hard disk drive rebuilds are executed in different ways with different performance impacts and levels of transparency. The most efficient and reliable methods of hard disk drive rebuilding are designed to be transparent to the user and to have minimal effect on system performance. Such a system is described in U.S. Pat. No. 5,101,492, entitled, "Data Redundancy and Recovery Protection," the disclosure of which is hereby incorporated by reference. However, this and other conventional methods of hard disk drive rebuild take several hours to complete and, even though transparency is achieved, system performance is degraded. Time is a major consideration when rebuilding a hard disk drive in a RAID system due to the inherent reduced level of data protection that exists until the drive rebuild is complete. Should another hard disk drive in the RAID system fail during the rebuild, permanent loss of data may occur.

Another major consideration for rebuild activity is the availability of data to system requests. In essence, drive rebuild activity must compete for system resources with system access activity. For high-use systems, one solution is to perform hard disk drive rebuilds during non-peak times. Such a solution is described in U.S. Pat. No. 5,822,584, entitled, "User Selectable Priority for Disk Array Background Operations," the disclosure of which is hereby incorporated by reference. Until the disk is rebuilt, the underlying data in the host system is vulnerable during the high-traffic times that rely most on data reliability and consistency.

SUMMARY OF THE INVENTION

The present invention is a system and method for volume rebuilding in a RAID system for a networked storage system. The invention decreases rebuild time for a hard disk drive in a RAID array and reduces the performance impact during a hard disk drive rebuild. The invention enables a hard disk drive under rebuild to be available more quickly, and minimizes the failure window for a second hard disk drive failure during hard disk drive rebuild in a RAID system. The system and method of the present invention facilitate rebuilding a hard disk drive in a period of time that is a small fraction of the time required for a conventional hard disk drive rebuild, in a manner that allows controllable impact of the rebuild activity on system performance.

The present invention supports the usage of dissimilar drives in a RAID system by segmenting each drive into extents, so that the hard disk drive procedure concentrates on rebuilding the extent and only has to be large enough to accommodate the written volumes in the failed hard drive. In addition, the present invention allows the rebuilt drive to be used during the rebuilding process as data is restored. This is accomplished through a hardware-accelerated coordination of cache and drive mapping management, allowing for optimum data availability during the rebuild process.

Other features and advantages of the present invention will become apparent from the following description of the invention, which refers to the accompanying drawings.

DETAILED DESCRIPTION OF THE PREFERRED EMBODIMENTS

The present invention is described more fully hereinafter with reference to the accompanying drawings, in which preferred embodiments of the invention are shown. The invention may, however, be embodied in many different forms and should not be construed as limited to the embodiments set forth herein. Specifically, for example, any unit designated "processor", "controller", "block", etc. may be implemented as an application specific integrated circuit (ASIC); a conventional computer or computer system; a reduced instruction set computer (RISC); any combination of hardware, software or firmware; a field programmable gate array (FPGA); any equivalent of the above; or any combination thereof. The system and method described herein is not limited to use in RAID systems, but may be employed in any random access data storage media.

Figure 1:
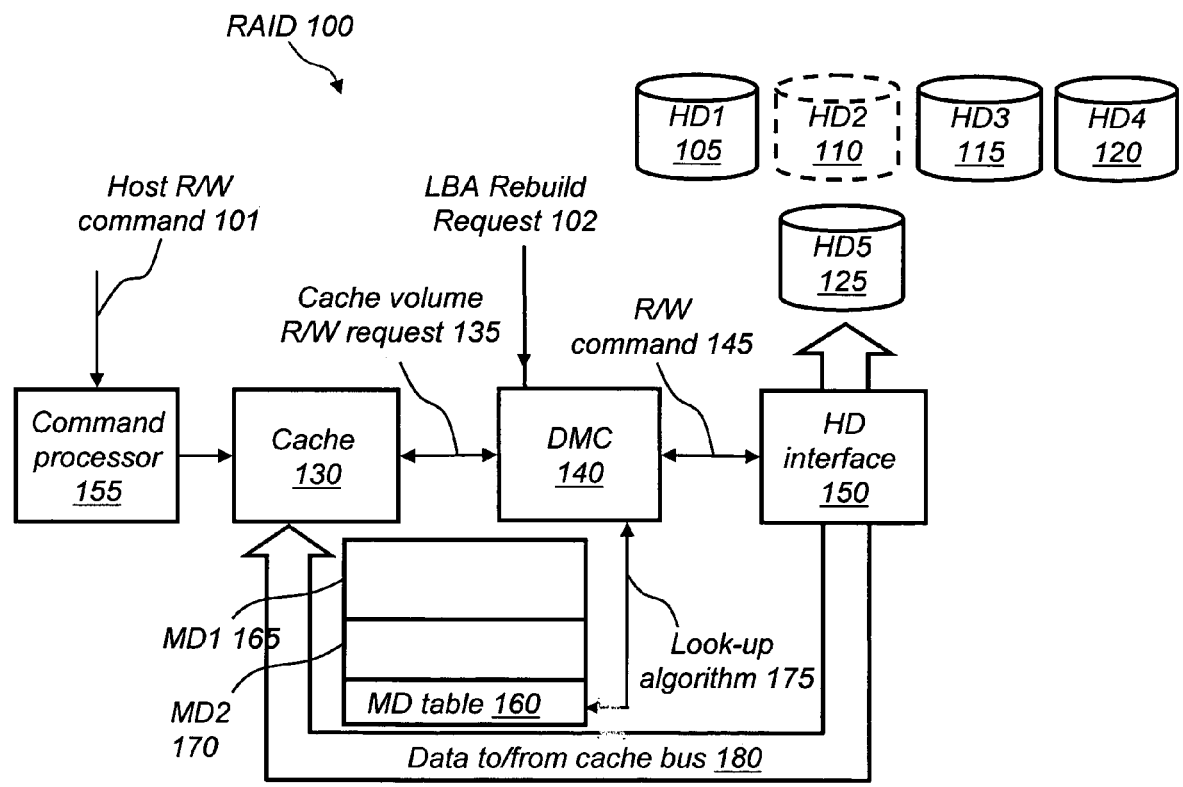
FIG. 1 is a block diagram of a system for volume rebuilding in a RAID system in accordance with the present invention.

FIG. 1 is a block diagram of a system for volume rebuilding in a RAID system 100 in accordance with the present invention. RAID system 100 is a redundant array of independent disks that include hard drives 105, 110, 115, 120, and 125. During typical operations, a read or write (R/W) command 101 originates in a host system or networked storage system fabric and is processed by a command processor 155. Cache 130 is a dynamic random access memory block dedicated to read and write caching functions. Cache 130 forwards a formatted cache volume R/W request 135 to Disk Mapping Controller (DMC) 140 according to system administration rules set and managed through command processor 155.

DMC 140 is a hard disk (HD) drive RAID mapping controller that processes and sends R/W command 145 to HD interface 150. DMC 140 is described in further detail in U.S. pat. No. 6,912,643. DMC 140 receives LBA rebuild request 102 when a rebuild is in progress, as described below.

HD interface 150 is a functional block that controls the communication between DMC 140 and the hard disk drives in RAID system 100. HD1 105, HD3 115, and HD4 120 represent conventional hard disk drives in RAID system 100, and can include 1 to n hard disk drives, n being the maximum number of hard disk drives supported by the particular architecture and system hardware.

As shown in FIG. 1, HD2 110, depicted in dashed lines, is a failed hard disk drive in RAID system 100, and HD5 125 is a replacement hard disk drive. HD interface 150 manages data transfers from cache 130 over Data to/from cache bus 180 to any available hard disk drive in RAID system 100. Mapping Descriptor (MD) table 160 is a table containing a plurality of mapping descriptors, e.g., MD1 165 and MD2 170, which associate a number of hard disk drives into a RAID set with a designated RAID type, stripe size, etc. MD1 165 also includes information describing the status of the RAID set (degraded or normal) as well as the status of each drive. Look-up algorithm 175 checks requests from DMC 140 against the listed hard disk drive status in MD table 160. MD2 170 is a shadow of MD1 165 and functions as a working copy maintained during hard disk drive rebuild.

In operation, the system administrator for RAID system 100 sets fault tolerance parameters according to the specific capacity of all of the hard disk drives in RAID system 100, the number of hard disk drives in RAID system 100, the RAID level, and the performance requirements of the host system, as well as any other criteria that may be specific to the networked storage system. When an event occurs that causes a hard disk drive failure according to the fault tolerance parameters set by the system administrator, as represented by failed hard disk drive HD2 110, the hard disk drive is immediately taken out of service in RAID system 100.

The information maintained in MD table 160 includes whether HD2 110 is degraded or normal and whether HD2 110 is in the process of being rebuilt. MD1 165, which had previously been normal, is marked degraded when the hard disk drive failure event takes HD2 110 out of service in RAID system 100. MD1 165 is marked rebuild when HD2 110 is replaced with a replacement drive. Drive rebuilds must be performed every time a failed disk drive is replaced in order to maintain the same level of data protection and system performance. HD5 125 is brought into RAID system 100 as a replacement drive. HD5 125 is either a hot spare or a newly installed hard disk drive. RAID system 100 recognizes HD5 125 and begins the process of rebuilding. At the completion of the rebuilding process, all of the data previously stored on HD2 110 is written on HD5 125. This data is taken from the redundant copies of the data that are stored on HD1 105, HD3 115, and HD4 120 according to the mirroring or striping of RAID system 100. In addition, data written from the host to the volumes being rebuilt subsequent to the hard disk drive failure is also written to HD5 125.

Unlike conventional RAID configurations, the present invention allows for replacement hard disk drive HD5 125 to be to be a different size than HD2 110. Replacement hard disk drive HD5 125 must have the capacity to accommodate at least the volumes that were on HD2 110, but it does not have to have an identical number of logical block addresses (LBAs), as long as it has at least as many as required to rebuild the volume. Any additional capacity can be designated for immediate use by other volumes. HD5 125 is associated with MD1 165 as a degraded drive. HD2 110 is no longer considered part of RAID system 100, and is physically removed. To RAID system 100, a hard disk drive that has been designated as degraded is not available for any read commands.

Host R/W commands 101 are commands that enter RAID system 100 from the host environment. When command processor 155 processes a read command that points to an LBA corresponding to a volume that was previously on HD2 110 and is now on HD5 125, the command is sent to cache 130. The command is translated into an internal request format and sent to DMC 140 as a cache volume R/W request 135. DMC 140 uses look-up algorithm 175 to check MD table 160 for the status of the target LBAs. MD1 165 indicates that HD5 125 is not available for reading, so DMC 140 determines the location of the redundant data that is striped or mirrored across HD1 105, HD3 115, and HD4 120 in order to reconstruct the data requested in the read command. The redundant storage method of RAID system 100 recreates the data for the read command via HD interface 150. The read data travels to cache 130 by way of Data to/from cache bus 180.

Because MD1 165 indicates that HD5 125 is in rebuild mode, host write command goes to HD5 125. The write command also performs whatever redundant write is necessary according to the specific RAID system 100 configuration. The data for the write command travels to the hard disk drive and redundant mirrored or striped data destination from cache 130 to HD interface 150 and to the appropriate hard disk drive(s). Data destination locations in terms of LBAs are determined and communicated by DMC 140. The data and destination location are bundled together by HD interface 150 and written to the appropriate hard disk drives.

At the beginning of the rebuild process, MD table 160 creates a shadow of MD1 165, labeled MD2 170 within the same table. This shadow is marked normal or rebuilt. MD2 170 is a structure created to allow for tracking the progress of the rebuild and making available portions of the rebuilt drive for normal operations as soon as possible.

DMC 140 manages any write commands addressed to volume LBAs physically located on HD5 125 by referencing MD1 165 or MD2 170. In order to rebuild HD5 125 so that it is an exact duplicate of HD2 110, the redundant data, striped or mirrored across HD1 105, HD3 115, and HD4 120 according to the particular RAID architecture employed, must be written onto HD5 125. Command processor 155 controls the processing of all host R/W commands 101, and also controls the processing of the read/write commands necessary to rebuild the data so that HD5 125 can be completely restored. Additional read commands are processed and read from the redundant location, and the reconstructed data is written to HD5 125. The rate at which the hard disk drive is rebuilt is determined by the system administrator and is decided according to the overall drive and system capacity and how much a performance impact is acceptable. The faster the rate of rebuilding, the more performance degradation will occur for the period of the rebuild. Slower rebuilds have less direct performance degradation, but allow for a greater additional hard disk drive failure window. Conventional hard disk drive rebuilds take several hours, during which the entire capacity of the newly activated hard disk drive HD5 125 is unavailable for normal RAID operations. In contrast, the present invention both enables a significant increase in rebuild speed and increases access to HD5 125 capacity as the rebuild process progresses. The speed of rebuild boundary is a function of the hard disk drive sequential write speed, which defines how quickly rebuild data can be written to the hard disk drive. Individual rebuild times vary according to hard disk drive performance, the amount of data transferred, and the amount of disk bandwidth assigned to the rebuild.

Figure 2:
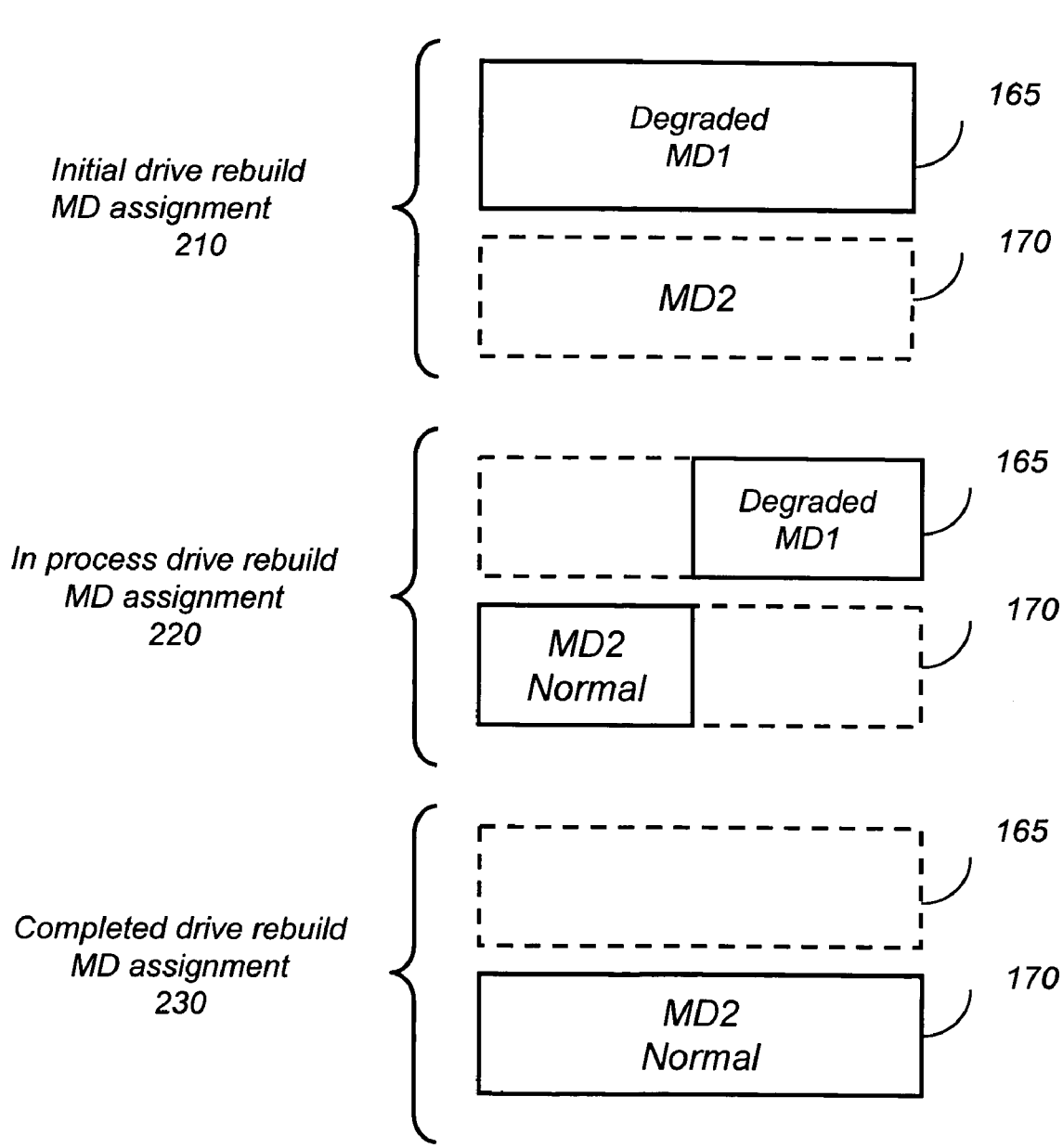
FIG. 2 shows the rebuild sequence for a mapping descriptor and a shadow copy of the mapping descriptor in accordance with the present invention.

In conventional RAID system rebuilds, the entire rebuild must complete before any of the capacity of HD5 125 is made available for normal RAID system operations. This means all read commands for data that resided on failed HD2 110 must be reconstructed from redundant data on the other hard disk drives in RAID system 100. A critical aspect of the present invention is the performance enhancement enabled when portions of HD5 125 are made available for reading as soon as they are rebuilt. FIG. 2 illustrates rebuild sequence 200, including MD1 165 and MD2 170, as described in FIG. 1. Rebuild sequence 200 is comprised of initial drive rebuild MD assignment 210 (where all LBAs are mapped as degraded), in process drive rebuild MD assignment 220 (where the portions of the drive that have been rebuilt are mapped as normal), and completed rebuild MD assignment 230 (where all the LBAs are mapped as normal after the rebuild is complete).

As the drive rebuild progresses, the rebuilt LBAs are moved from the degraded MD1 165 to the non-degraded or normal MD2 170, and from that point on the drive can process read and write commands normally for those LBAs. The number of LBAs rebuilt at a time, and the intervals between rebuild operations, is programmable and can be based on system activity level or other system criteria. At the completion of the rebuild, the full LBA space of the volume is marked as normal, and MD1 165 is no longer needed.

Figure 3:
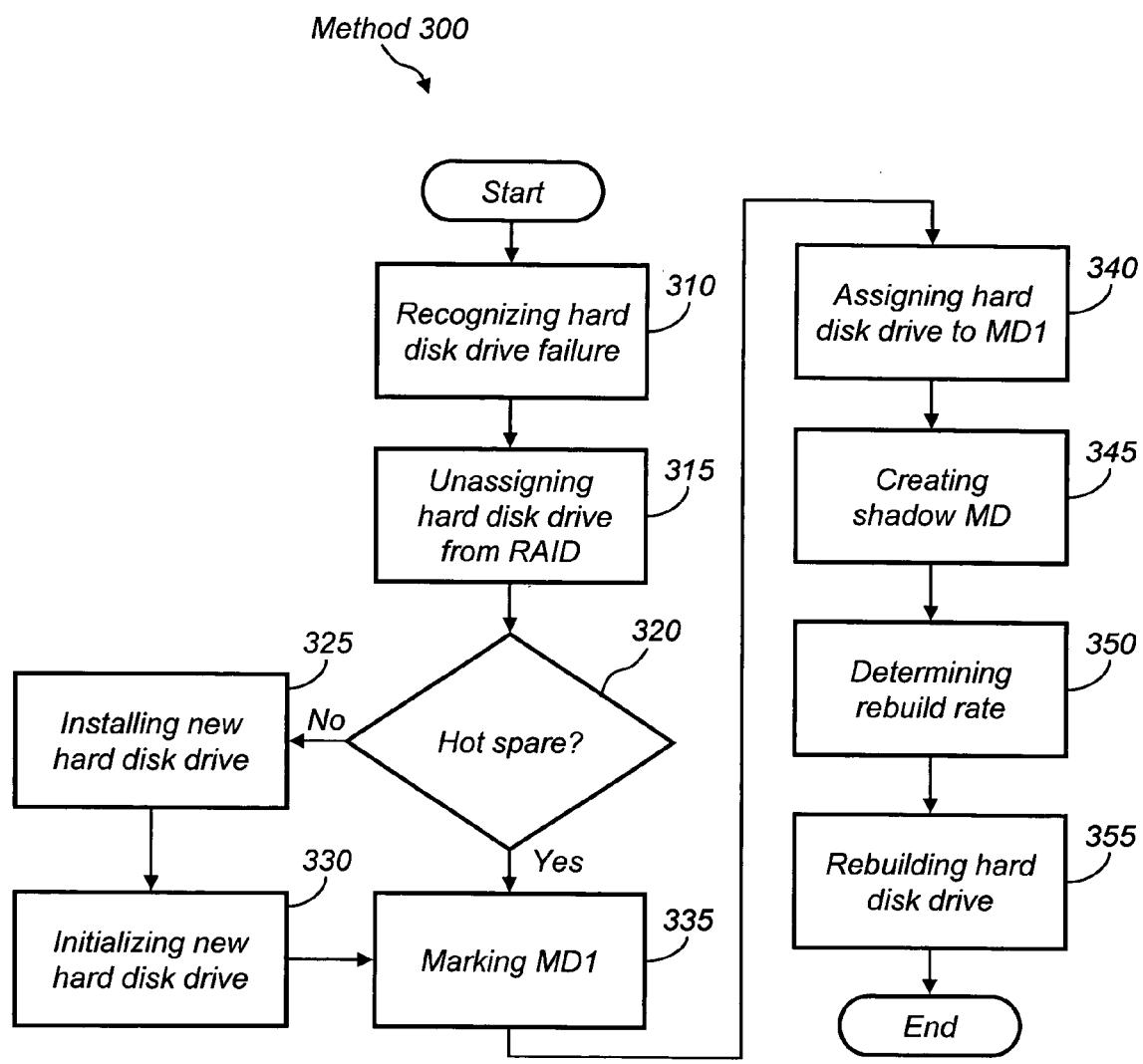
FIG. 3 is a first flow chart showing the rebuilding of a hard disk drive in a RAID system in accordance with the present invention.

FIG. 3 illustrates a preferred method 300 for rebuilding a hard disk drive in RAID system 100 in accordance with the present invention, including the steps of:

Step 310: Recognizing Hard Disk Drive Failure

In this step, according to RAID drive detection parameters set by the system administrator, a hard disk drive failure is detected in one of the hard disk drives in RAID system 100. In FIG. 1, a failed hard disk drive is illustrated by failed hard disk drive HD2 110.

Step 315: Unassigning Hard Disk Drive from RAID.

In this step, failed hard disk drive HD2 110 is unassigned from RAID system 100.

Step 320: Hot Spare?

In this decision step, the system determines if there is a hot spare (replacement HDD) ready for placement in RAID system 100. Hot spares are hard disk drives that have been inserted into RAID system 100 and initialized, but not activated or made available. If yes, method 300 proceeds to step 335; if no, method 300 proceeds to step 325.

Step 325: Installing New Hard Disk Drive.

In this step, the system administrator installs a new hard disk drive to replace HD2 110. In the present invention, replacement hard disk drives, as represented by HD5 125, do not have to be identical in size to the failed hard disk drive that they replace. The rebuild drive need only be large enough to accommodate data stored (volumes written) on the drive to be rebuilt. This flexibility is allowed and supported because the present invention uses flexible RAID mapping techniques instead of traditional mapping methods. RAID mapping is described in more detail in U.S. Pat. No. 6,912,643. Once a new hard disk drive has been installed, a new RAID set is created (a RAID set is a mapping of the hard disk drives in a RAID system). The new RAID set includes all of the old mappings except those of the failed hard disk drive plus mappings for the new hard disk drive. Once a new RAID set is created, it is partitioned into a rebuilt section and a non-rebuilt section.

Step 330: Initializing New Hard Disk Drive.

In this step, HD5 125 is initialized in order to make it available for rebuilding in RAID system 100.

Step 335: Marking MD1.

In this step, MD1 165, which had previously been normal, is marked degraded to indicate that a drive rebuild is occurring. MD1 165 is a data structure within MD table 160 that is checked by DMC 140 when a read or write command is processed.

Step 340: MD1 is Assigned to Hard Disk Drive.

In this step, MD1 165 is assigned to new hard disk drive HD5 125. This assignment allows for rerouting of read requests and special handling of write requests upon receipt.

Step 345: Creating Shadow MD.

In this step, MD2 170, a copy of MD1 165, is created within MD table 160. As new hard disk drive HD5 125 is rebuilt, the number of volume LBAs mapped by MD2 170 grows larger and MD1 165 grows smaller, until none of the LBAs of the volume are mapped by MD1 165 and MD2 170 is marked completely normal.

Step 350: Determining Rebuild Rate.

In this step, the rebuild rate is determined according to predetermined parameters including: hardware capacity, specific system architecture and size, desired speed of rebuild, and acceptable levels of performance degradation. The faster the rebuild, the smaller the failure window for the system; however, extremely rapid rebuilds may have a discernable performance impact on the system. These parameters are set before the initiation of the present invention, but are actively considered at this point in the execution of the present method.

Step 355: Rebuilding Hard Disk Drive.

In this step, HD5 125 is rebuilt according to the rebuild rates set and specific algorithms. DMC 140 receives LBA rebuild request 102. Using cache 130 as a scratch buffer, DMC 140 generates the data for rebuilding HD5 125 by reading and processing the data from the redundant other drives HD1 105, HD3 115, and HD4 120. Upon the completion of each rebuild request, the corresponding LBAs are moved from MD1 165 to MD2 170.

Figure 4:
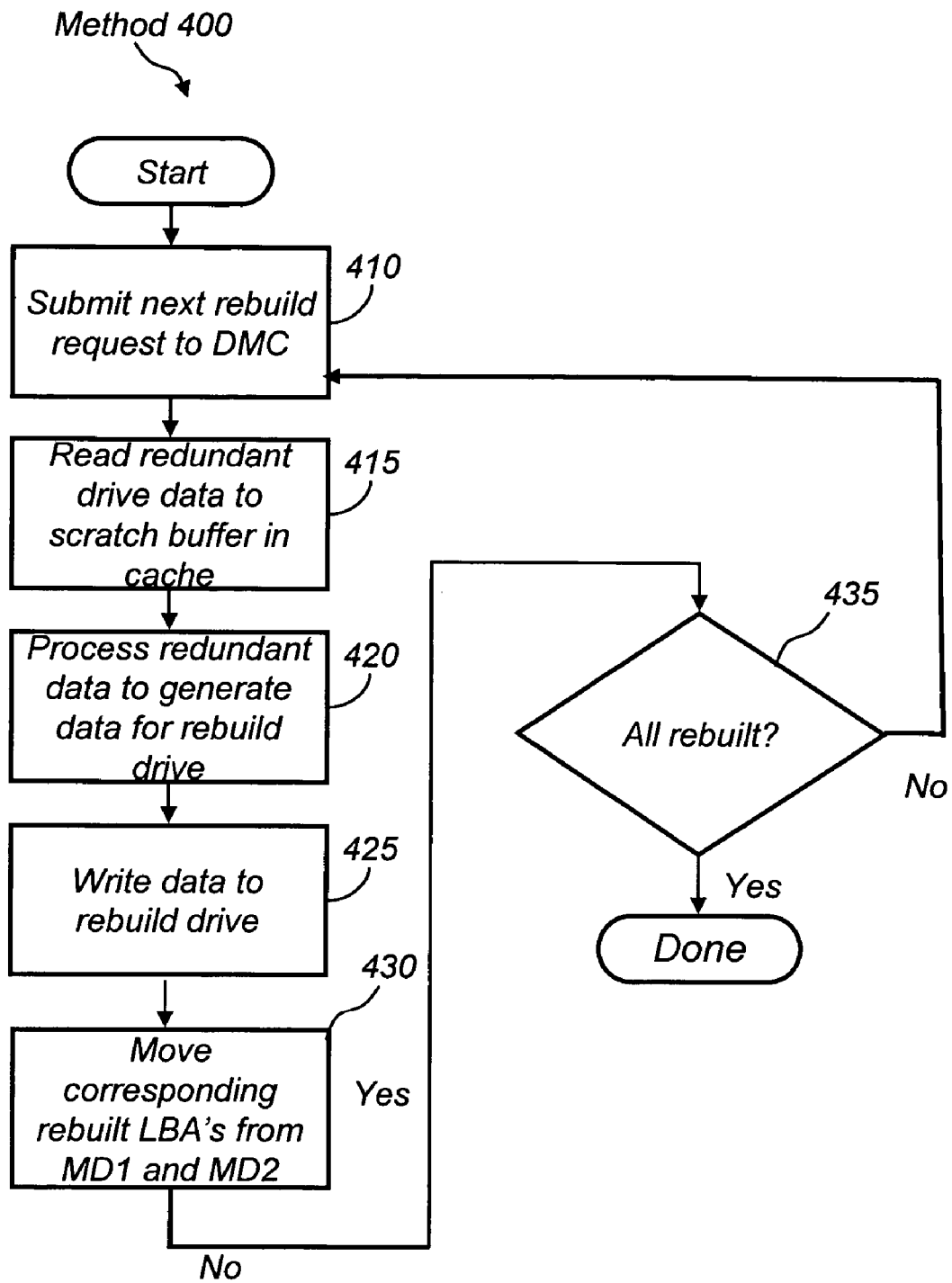
FIG. 4 is a second flow chart showing the process flow for rebuilding a hard disk drive in accordance with the present invention.

FIG. 4 illustrates the preferred process flow 400 for rebuilding a hard disk drive in accordance with the present invention, including the steps of:

Step 410: Submit Rebuild Request.

In this step, an LBA rebuild request 102 is received by DMC 140.

Step 415: Read Redundant Data from Other Disk Drives.

In this step, redundant data from other disk drives HD1 105, HD3 115, and HD4 120 is read and stored in a scratch buffer in cache 130.

Step 420: Process Redundant Data to Generate Data for Rebuild Drive.

In this step, the data in the scratch buffer of cache 130 is processed to generate and re-create the data for the replacement drive HD5 125.

Step 425: Write Data to Rebuild Drive.

In this step, the data generated in step 420 is written to the replacement drive HD5 125.

Step 430: Move Corresponding Rebuilt LBAs from MD1 and MD2.

In this step, the LBAs corresponding to the rebuilt data are moved from MD1 165 to MD2 170.

Step 435: All Rebuilt?

If the disk drive is completely rebuilt, the process ends. If not, the next rebuild request is submitted to DMC 140, and process 400 repeats as before.

Although the present invention has been described in relation to particular embodiments thereof, many other variations and modifications will become apparent to those skilled in the art. Therefore, the present invention is to be limited not by the specific disclosure herein, but only by the appended claims.

What is claimed is:

1. A method for rebuilding a hard disk drive in a RAID array which allows data access to partially rebuilt disk drives during a hard disk drive rebuild, comprising the steps of:
   maintaining status information on the hard disk drives in the RAID array, including information indicating whether individual hard disk drives of the RAID array are normal or in the process of being rebuilt, and information indicating whether portions of each disk drive under rebuild have been rebuilt; and
   accessing the status information and directing a data read from a portion of a partially rebuilt hard disk drive in response to a read request, if the status information indicates that the portion of the partially rebuilt hard disk drive which contains the requested data has been rebuilt.

2. A method of rebuilding a hard disk drive in a RAID system, comprising the steps of:
   recognizing a failure of a hard disk drive in the RAID system;
   unassigning the failed hard disk drive from the RAID system;
   assigning an available replacement hard disk drive, creating a new RAID set, and rebuilding the replacement hard disk drive;
   maintaining information indicating that the replacement hard disk drive is under rebuild and information indicating when portions of the replacement disk drive have been rebuilt and are available;
   incrementally making rebuilt portions of the replacement disk drive available during the rebuild process.

3. The method of claim 2, wherein the rebuilding of the replacement disk drive is performed at a fixed rate.

4. The method of claim 2, wherein the rebuilding of the replacement disk drive is performed at a variable rate based upon non-rebuild requests.

5. The method of claim 2, wherein a data structure is used to maintain said information on the status of the replacement disk drive rebuild.

6. The method of claim 5, wherein said step of maintaining said information on the status of the replacement disk drive rebuild comprises:
   creating a first mapping descriptor within said table;
   creating a second mapping descriptor which is a shadow copy of said first, mapping descriptor and functions as a working copy maintained during said replacement hard disk drive rebuild;
   marking said first mapping descriptor with a degraded designation upon a hard disk drive failure event; and
   progressively migrating LBAs from said first mapping descriptor to said second mapping descriptor as said hard disk drive rebuild progresses until rebuild is complete, and concurrently allowing corresponding rebuilt portions of said rebuilt hard disk drives to be read from during said hard disk drive rebuild.

7. The method according to claim 2, further comprising the step of recreating on said replacement hard disk drive under rebuild any data written to alternate hard disk drives subsequent to said hard disk drive failure.

8. A method for processing data requests during a hard disk drive rebuild, comprising the steps of:
   receiving a read or write command from a host computer;
   determining whether a target of said received command is in a hard disk drive which is degraded;
   executing a normal sequence if said target of said received command is in a hard disk drive which is not degraded;
   determining whether said target of received command is in a portion of hard disk drive under rebuild;
   executing said received command on said portion of said hard disk drive under rebuild if said portion of the hard disk drive under rebuild has already been rebuilt and even though said hard disk drive under rebuild is still being rebuilt; and
   executing said received command on a redundant data destination if said portion of said hard disk drive under rebuild has not been rebuilt.

9. A system for rebuilding a hard disk drive in a RAID array which allows data access to partially rebuilt disk drives during a hard disk drive rebuild, comprising:
   a data structure for maintaining status information on the hard disk drives in the RAID array, said data structure including information indicating whether the hard disk drives of the RAID array are normal or in the process of being rebuilt, and information indicating whether portions of each disk drive under rebuild have been rebuilt; and
   a controller for accessing the data structure and coordinating the reading of data from a portion of a partially rebuilt hard disk drive in response to a read request if the status information in the data structure indicates that the portion of the partially rebuilt hard disk drive which contains the data has been rebuilt and is available.

* * * * *